US007016821B2

(12) United States Patent
Rameau et al.

(10) Patent No.: US 7,016,821 B2
(45) Date of Patent: Mar. 21, 2006

(54) SYSTEM AND METHOD FOR THE INDUSTRIALIZATION OF PARTS

(75) Inventors: Jean-Francois Rameau, Lisses (FR); Patrick Catel, Paris (FR); Xavier Gourdon, Paris (FR); Alex State, Paris (FR); Pascal Sebah, Paris (FR)

(73) Assignee: Dassault Systemes, Suresnes Cedex (FR)

( * ) Notice: Subject to any disclaimer, the term of this patent is extended or adjusted under 35 U.S.C. 154(b) by 764 days.

(21) Appl. No.: 09/839,039

(22) Filed: Apr. 20, 2001

(65) Prior Publication Data

US 2002/0183877 A1 Dec. 5, 2002

(51) Int. Cl.
*G06F 17/10* (2006.01)
*G06F 19/00* (2006.01)

(52) U.S. Cl. ............................ 703/2; 700/97; 700/197; 700/200

(58) Field of Classification Search .................... 703/2; 700/97, 197, 200
See application file for complete search history.

(56) References Cited

U.S. PATENT DOCUMENTS 5,189,781 A * 3/1993 Weiss et al. ............... 29/527.2
5,552,995 A * 9/1996 Sebastian ...................... 700/97
6,484,063 B1 * 11/2002 Liou et al. .................... 700/98

FOREIGN PATENT DOCUMENTS

WO WO 01/28781 4/2001

OTHER PUBLICATIONS

European Search Report for EP App. No. 02290924 dated Feb. 22, 2005.

B. Ravi et al, Decision Criteria for Computer-Aided Parting Surface Design dated Jan. 1990, pp. 11-18.

Patent Abstracts of Japan dated May 12, 1993, vol. 017, No. 235 (P-1533).

Patent Abstracts of Japan dated Feb. 29, 2000, vol. 2000, No. 02.

I C You et al, Expert System for Castability Evaluations: Using a Fixed-Features Based Design Approach dated 1989, pp. 181-189.

Jung-Hong Chuang et al, Variable-Radius Blending of Parametric Surfaces, dated 1995, pp. 513-525.

T. Harada et al, Variable-Radius Blending by Using Gregory Patches in Geometric Modeling dated Sep. 2, 1991, pp. 517-518.

* cited by examiner

*Primary Examiner*—Paul L. Rodriquez
*Assistant Examiner*—Dwin M. Craig
(74) *Attorney, Agent, or Firm*—Clifford Chance US LLP; James V. Mahon

(57) ABSTRACT

This invention presents a method and system for industrializing a designed part. This invention includes selecting a parting surface to divide the designed part, which includes a functional specification, into a first side and a second side, and selecting a draft angle. A change is computed in the first side and the second side using the selected draft angle. During the computation, the functional specification is maintained and the first side and second side meet on the parting surface. A face and a pulling direction can also be selected on the designed part. The selected face can be parallel to the pulling direction for the first side. Faces adjacent to the selected face can also be used in the computation. Once computed, the industrialized designed part can be displayed. An optimal blend draft method or a driving/driven blend draft method can be selected to compute the designed part.

37 Claims, 10 Drawing Sheets

SYSTEM AND METHOD FOR THE INDUSTRIALIZATION OF PARTS

BACKGROUND

In the mechanical part industrialization field, designers use computers to design and manufacture mechanical parts. The design of a mechanical part usually involves two steps. The first step is the functional design, which allows the designer to set the shape, dimensions, and features of the part to fulfill a functional specification. Designers usually accomplish this step with the use of Computer Aided Design ("CAD"). CAD programs allow designers to create and view three-dimensional representations of a part. Usually, CAD programs do not design the part based on how the part will be manufactured, but instead based on the functional specification of the part.

The second step in the design of a mechanical part is the part industrialization, which allows the designer to change the shape of the functional part so that it can be manufactured. Designers usually accomplish this step with the use of CAD. The part industrialization step depends on the manufacturing process and ideally saves the functional design of the part. Examples of manufacturing processes include molding, stamping, machining, forging, bending, and welding.

During the part industrialization step of a molding design, the designer usually changes the shape of the functional part to ensure proper manufacturing. FIG. 1 is an example of a designed functional part that needs to be industrialized. The mold for the functional part includes two sides, an upper side 105, and a lower side 106, divided by a parting surface 102. The parting surface 102 is the interface between the upper side and the lower side of the mold, and the two sides 105 and 106 have opposite pulling directions 104. The pulling direction is the directions that the molds of the two sides can be pulled apart. Complex molds can involve more than two sides. These extra sides (also known as slides) can be designed to manufacture details of the part that cannot be formed with just two sides.

Draft angles can be used in the industrialization step to ease the extraction of a new part from the mold, ensure that the mold does not break, and ensure the part does not have bad surface quality. A draft angle can be added to faces in the mold that are parallel to the pulling direction. These faces are drafted (or bended) according to a given angle.

The draft angle typically should not fundamentally change the functional specification of the part. Otherwise, the mechanical specifications of the part can be lost during the manufacturing process. Furthermore, the sides of the drafted part should fit on the parting surface. Otherwise, small and sharp steps can remain on the final part, which, in most cases, have to be removed by hand in expensive post processing.

Small steps can also cause problems when the mold is used in another molding process. FIG. 2 demonstrates an example of this in the sand core problem. FIG. 2*a* shows the drafted sand core 202 having two sides 204 and 205 separated by a parting surface 201. A small step 203 has been introduced during the industrialization step when the draft angle was added to the two sides. When the two sides of the drafted sand core are used to create the two molds 206 and 207, as is shown in FIG. 2*b*, the step appears in the final mold. When the hot liquid metal flows around the sand core 208 in the final mold 210, sand can escape from the drafted sand core 208 into the liquid metal, which can ruin the quality of the part.

As is shown in FIG. 5, current CAD systems that manually add the draft angle can require that designers draft the upper sides 502 and lower sides 503 separately. The resulting surfaces of the separately designed part may not fit on the parting surface 501.

Low-level graphic and geometric tools are currently used to change the points and faces of the designed part to implement the draft angle. Such low-level work can take long periods of time and can require many individual user interactions with the design program. These existing techniques involve complex surfacing tools and the skilled user usually has to build the drafted faces and fit the faces on the parting surface manually. This hand made geometry is generally fragile and rework is necessary when modifications are made to the functional part. This invention addresses some of these problems.

SUMMARY

This invention relates to the industrialization of a designed part. In particular, the present invention presents a method and system for adding a draft angle to a molded part.

In one aspect of this invention, a computerized method of industrializing a designed part is presented. The method includes selecting a parting surface that divides the designed part, which includes a functional specification, into a first side and a second side. A draft angle is also selected. A change is computed in the first side and the second side using the selected draft angle. During the computation, the functional specification is maintained and the first side and second side meet on the parting surface. A face and a pulling direction can be selected on the designed part. The selected face can be parallel to the pulling direction for the first side. Faces adjacent to the selected face can also be used in the computation. The faces can be bound by a sharp edge. Once computed, the industrialized designed part can be displayed.

In another aspect of this invention, a selection is made between an optimal blend draft method and a driving/driven blend draft method. In the optimal blend draft method, a selected corner radius for smoothing a connection between two adjacent faces can be used in the computation. A transitions between a face on each side can include using a blending equation and the corner radius. The computation can include automatically switching a driving side between a first and second side to minimize material added. The draft angle can include a first minimum draft angle for the first side and a second minimum draft angle for the second side.

In the driving/driven blend draft method, the draft angle can include a nominal draft angle, which can be guaranteed. A selection of a driving side can be made. The computed designed part can be displayed and then recomputed based on new selections.

In another aspect of this invention, the functional specification can include a neutral element of the designed part, which remains unchanged during the computation. The computation can include calculating the shape with the neutral element using a formula with the parting surface, the draft angle, an equation for a cone on the side of the neutral element, an equation for a derivative of the cone, the cone's half angle, and a space variable.

In another aspect of this invention, the functional specification can include a reflective element of the designed part, which is tangent to the draft surface. The computation can include calculating the shape with the reflective element using a formula with the parting surface, the draft angle, an equation for a cone on the side of the reflective element, an equation for a derivative of the cone, and the reflect element.

The computation can include using one or more of the following blending equations:

$$B(r_0, a_0, b_0, a, b, u, v, \ldots) = \sqrt{r_0^2 + \|S(u,v) - P(.)\|^2}\,\sqrt{r_0^2 + \|S(u,v) - Q(.)\|^2}(a - a_0)(b - b_0) - r_0^2,$$

wherein S(u,v) represents a parting surface, $r_0$ represents a corner radius, P(.) represents a first curve or surface, Q(.) represents a second curve or surface, $a_0$ represents a minimum first draft angle, $b_0$ represents a minimum second draft angle, a represents a first draft angle, and b represents a second draft angle. The computation can include using a blending equation:

$$B(r_0, a_0, b_0, a, b, u, v, \ldots) = a - a_0,$$

wherein $a_0$ represents a minimum first draft angle and a represents a first draft angle. The computation can include using a blending equation:

$$B(r_0, a_0, b_0, a, b, u, v, \ldots) = b - b_0,$$

wherein $b_0$ represents a minimum second draft angle and b represents a second draft angle. The computation can include calculating a solution to an equation using marching methods or numerical continuation. The parting surface can be tangent continuous.

The described method can be implemented on a computer system including a computer, which includes a memory and a processor. Executable software residing in the computer memroy can be operative with the processor to implement the described method. The described method can also be implemented on a computer data signal embodied in a digital data stream. Similarly, the described method can be implemented on a data storage apparatus storing instructions to configure a computer to implement the described method.

This invention may have one or more of the following advantages. This invention can allow the designer to draft the faces crossing the parting surface in such a way to ensure that the functional specifications are maintained, the resulting surfaces are adjusted on the parting surfaces, and the minimum draft angle is preserved.

The method and system for adding the draft angle shortens the time spent in part industrialization because the correct shape is produced in one shot. The complexity of the CAD data is also reduced so that another user can easily understand the drafted part. What is done with a single solid modeling can feature require five to ten wire frame and surface features with the current technology. The invention can also create a solid part, which means that the system maintains the closed skin of the boundary of the solid. Solid modeling can accurately simulate real 3D objects. The geometry is more robust because of solid modeling integration. The system can also store the draft angle calculations and reapply them if the originally designed part is changed. Drafting a part with this invention can be easier, faster, and yield better geometry.

DESCRIPTION OF THE DRAWINGS

FIGS. 10–11 illustrates the application of the driven blending equation to a designed part.

FIGS. **13*a* and 13*b*** illustrates the driving-driven draft method.

Figure 14:
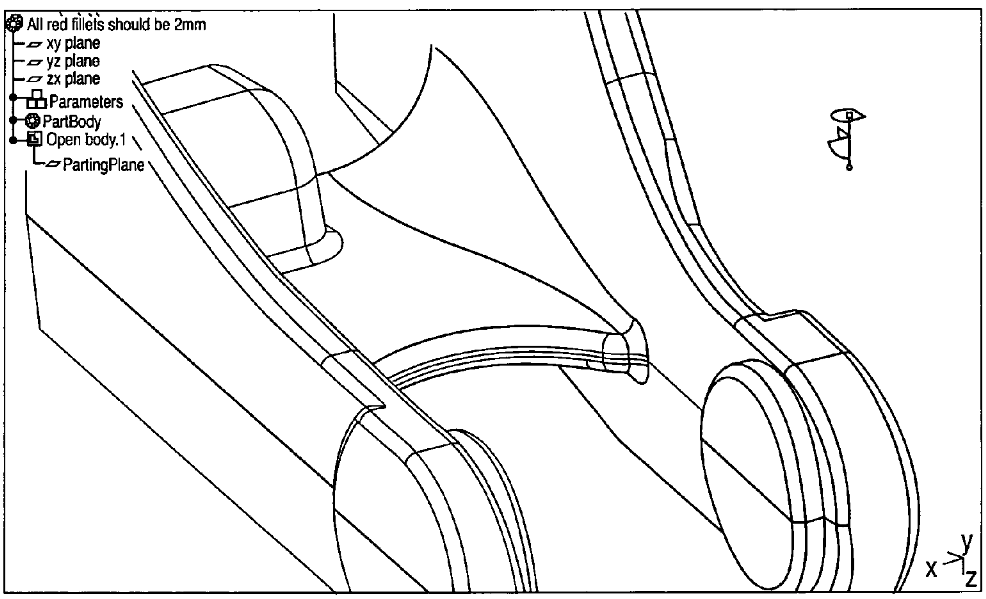

FIG. 14 illustrates the results of the application of the invention on a complex, industrial part.

DETAILED DESCRIPTION

Context:

This invention relates to the industrialization of a designed part. In particular, the present invention presents a method and system for adding a draft angle to a designed part. The designed part is a computer model of the part that will be manufactured.

Figure 1:
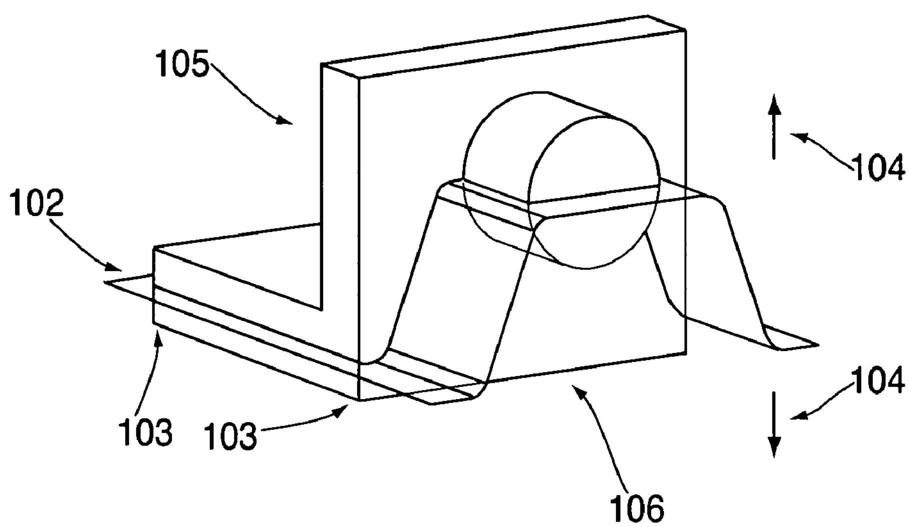
FIG. 1 illustrates a designed part with a parting surface.
Figure 2A:
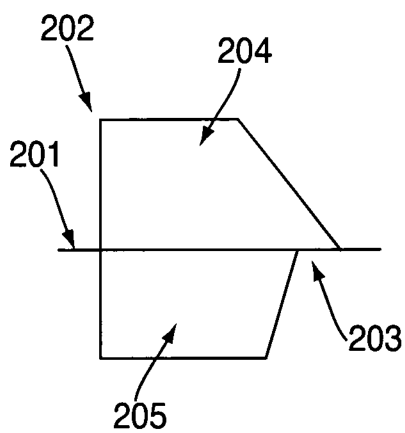
FIG. 2 demonstrates the problems that can occur in a designed part that do not properly meet across the parting surface.
Figure 2B:
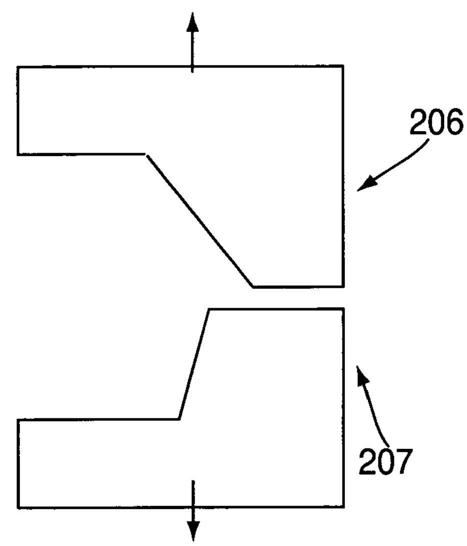
Figure 2C:
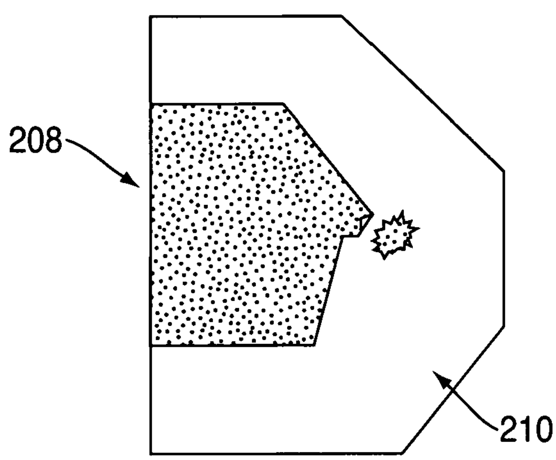
Figure 3:
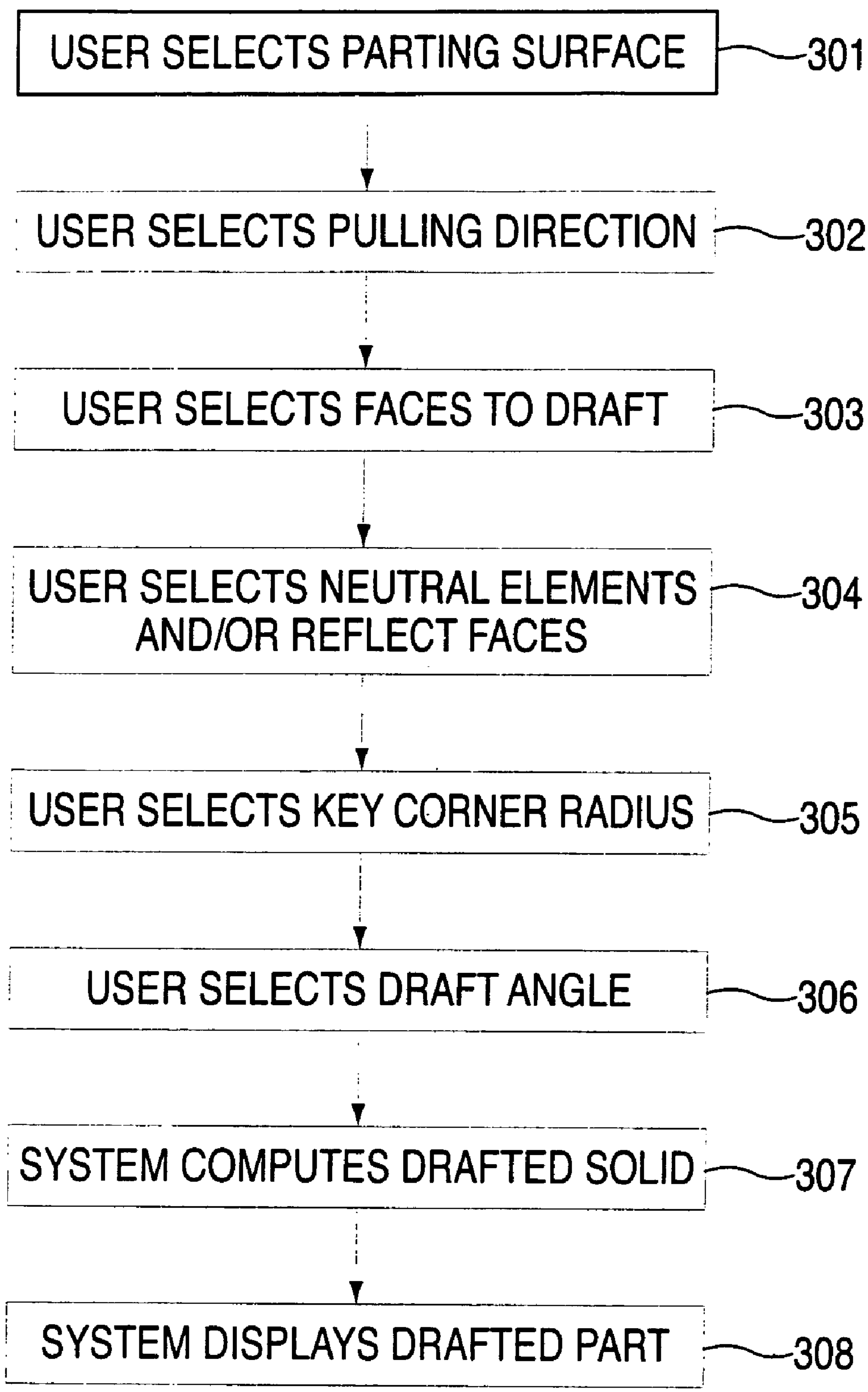
FIG. 3 illustrates a flowchart for computing a draft angle in the case of the optimal blend draft method.

FIG. 3 presents a method for the industrialization of the draft angle. To add the draft angle to the designed part, the invention uses a system of equations that can involve the parting surface, neutral curves, reflect surfaces, corner radius, and minimum draft angles. The solution to these equations are surfaces that share a common boundary on the parting surface and that can fit the neutral curves and the reflect surfaces. These solutions can form a solid model across both sides of the part.

The user selects the parting surface 301, S(u,v), which is the surface between the first side 105 and second side 106 of the part that will be manufactured. The parting surface is tangent continuous, but not generally curvature continuous. Based on the parting surface, the user selects the two pulling directions 104 for the two sides 302. The first pulling direction, $D_1$, and the second pulling direction, $D_2$, are the directions the sides can be pulled apart after forming a single part from the two sides. Each pulling direction is a three-dimensional vector that defines an oriented direction in space.

The words "upper" and "lower" are used to describe the two sides 105 and 106 using a vertical pulling direction. The "upper" side signifies the first or top side, and the "lower" side signifies the second or bottom side. This is not a geometrical restriction. The pulling direction can be horizontal, vertical, or at any angle between horizontal and vertical.

Figure 7:
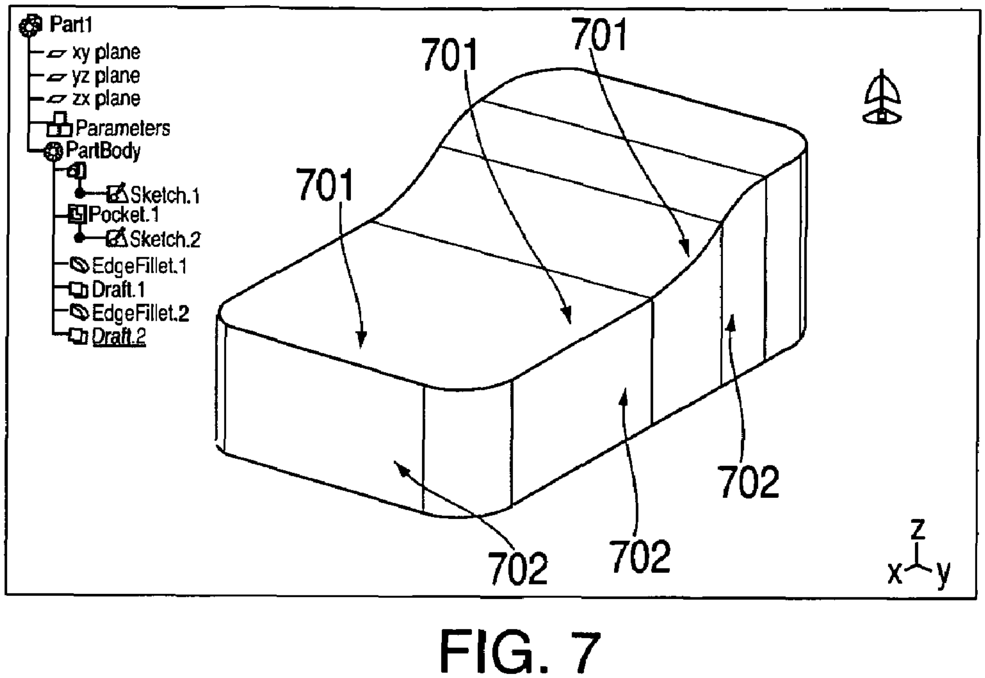
FIGS. 7–8 illustrates a designed part with a neutral curve.
Figure 8:
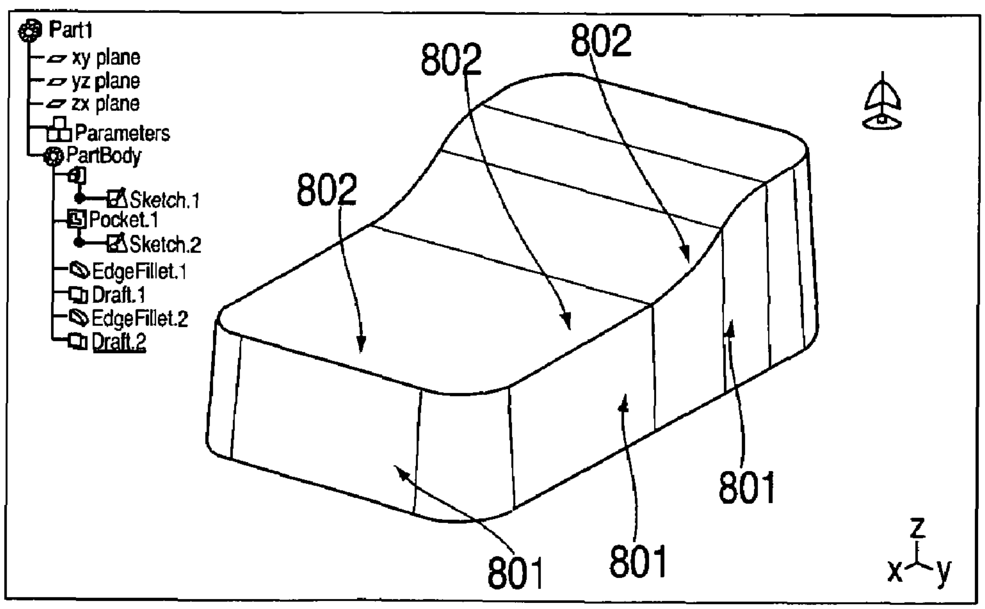

Selection of the Faces to Draft:

The user also selects the face to draft 303. The selection process can be automatically extended. For example, the user can select a face to draft and the computer can extend this selection to all the neighboring faces that share a common tangent at the intersection with the selected face. The computer can then extend the selection to neighboring faces of the neighboring faces in a recursive process. In FIG. 7, for example, the selection of only one vertical face 702 is necessary for the system to draft all the other vertical faces, which can yield the geometry 801 in FIG. 8. Faces that are parallel to the pulling direction can be chosen as draft faces to which the system will add a draft angle. In FIG. 7, the selected draft faces 702 are the sides of the designed part that will be drafted. FIG. 8 shows the same drafted sides 801 after the system implements the draft angle.

Figure 9:
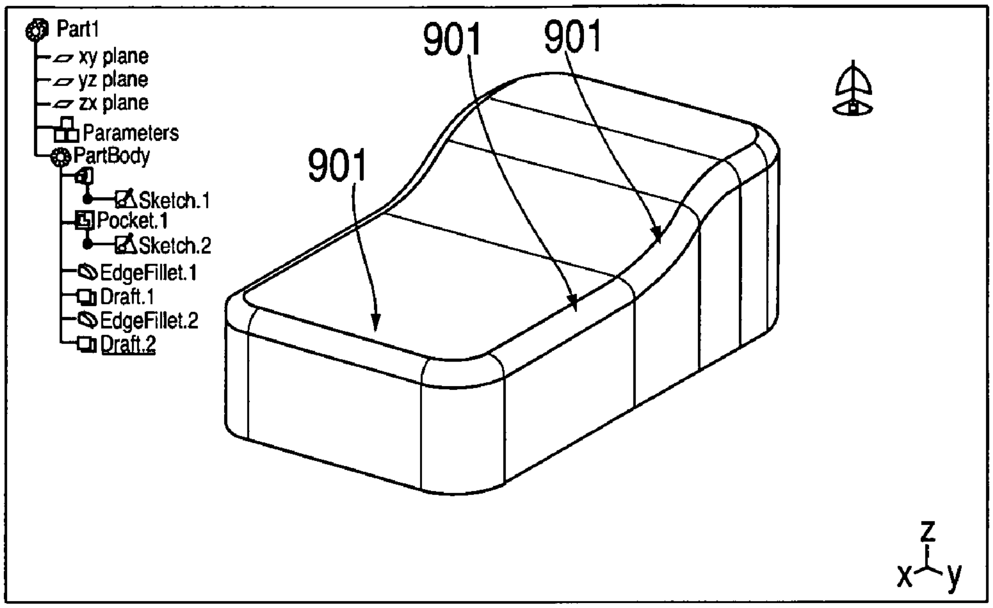
FIGS. 9–10 illustrates a designed part with a reflective surface.
Figure 10:
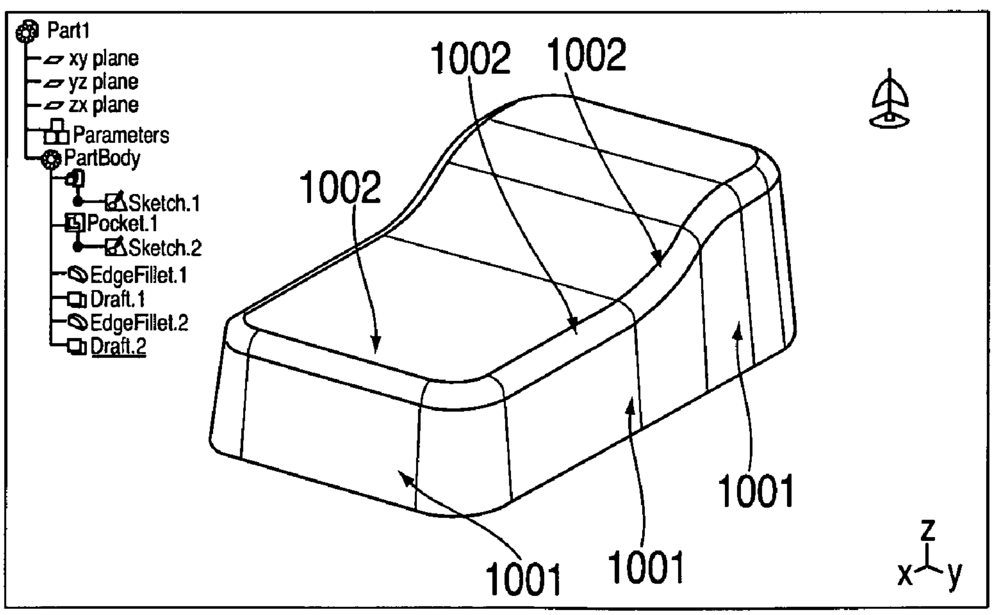

Selection of the Reference Elements:

The user also selects functional specifications, which can be neutral elements and/or reflect faces 304. During the drafting operation, neutral curves remain unchanged. The neutral curves are typically sharp edges of the mechanical part (but not all sharp edges are necessarily neutral curves). These edges can exist on the part itself, or can result from the intersection of the part and a neutral element (e.g., place or surface). The user's selection of neutral elements is what saves the functional dimensions of the part. The upper neutral curve, P(s), and lower neutral curve, Q(t), can be used to ensure that those edges are not changed when the draft angle is added. Referring to FIG. 7, the neutral curve 701 is illustrated in the part. The sharp edges of the non-drafted part are selected as neutral curves. After the system implements the draft angle on the part, as is shown in FIG. 8, the neutral curves 802 remain the same. FIGS. 7 and 8 illustrate the neutral curve draft angle in a simple case without any parting surface. FIGS. 9 and 10 illustrate the reflect draft angle in a simple case without any parting surface.

When no sharp edges are available for the drafted surface, reflect surfaces can be selected instead of the neutral elements. The user's selection of reflect surfaces defines where the drafted surfaces are connected to the part. The draft surface is tangent to the reflect surfaces. The user uses the upper reflect surface, $P(s_1,s_2)$, and the lower reflect surface, $Q(t_1,t_2)$, in place of the neutral curve in situations where no edge defines the functional dimensions of the part. FIG. 9 illustrates examples of reflect surfaces 901. After the system implements the draft angle on the part, as is shown in FIG. 10, the reflect surfaces 1002 may slide a bit or be slightly expanded or limited to accommodate the draft angle. In other situations, there may be a combination of a neutral curve on one side and a reflect surface on the other side.

Figure 13A:
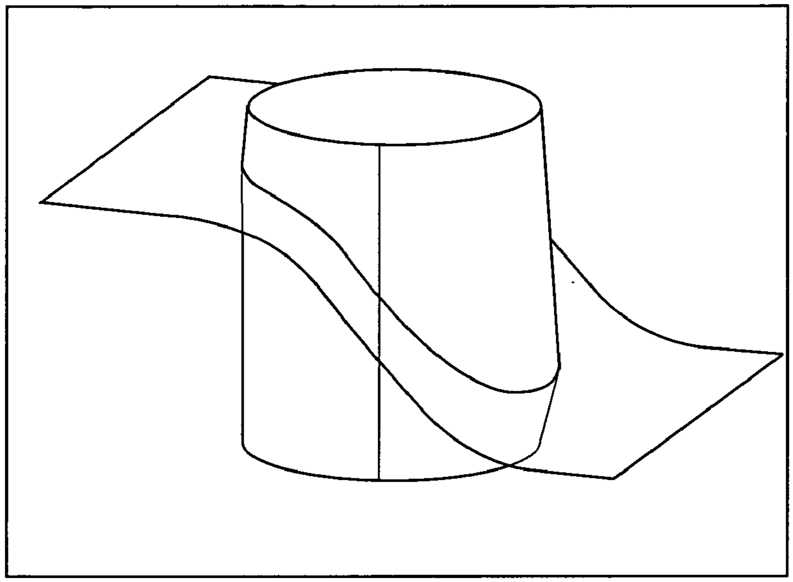
Figure 13B:
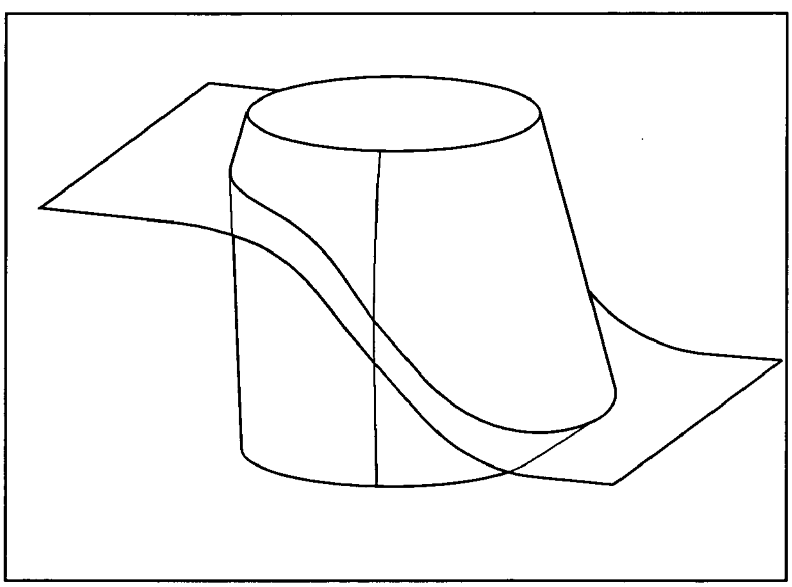

Selection of the Draft Method:

At this point, the user has two choices: either to choose which side of the part (as defined by the parting surface) will lead the drafting process, or let the system choose. The former method (known as the "driving/drive method") is usually iterative in the sense that entering the minimum draft angle for the selected side (known as the "driving side") does not automatically guarantee the sufficiency of the angle calculated by the system for the second side (known as the driven side). This can lead to an increased first draft angle, which can generate extra useless matter as is shown in FIGS. 13*a* and 13*b*.

In the second method (known as the "optimal blend draft"), the system chooses for each face which side will be the driving side, in order to minimize the amount of added matter. This may lead to the upper and lower faces being alternatively the driving and driven side for the same part. When this occurs, a blending step is used to create a smooth connection between faces involved in the transition to avoid the creation of filling faces that would show sharp edges. The upper and lower draft angles are automatically calculated so that they respect the minimum draft angles entered by the user. The order of these various steps are usually not important and can remain transparent to the user. Both of these methods are described in further detail below.

Definition of the Angle Values and Calculation of the Draft Faces:

Depending on the selected method, the user then inputs either one nominal draft angle value in the case of the driving-driven method, or two minimum draft angle values and a blending corner radius in the case of the optimal draft method.

In the case of the optimal draft method, the user selects the upper and lower minimum draft angles 306. The upper draft angle, $a_0$, and the lower draft angle, $b_0$, are minimum values for the angles that the system will add to the drafted faces. Some of the examples presented show an extreme draft angle for illustration purposes. In practice, the draft angle is usually quite slight to maintain the functional dimensions of the part. For example, a draft angle of two degrees can be used in aluminum and plastic, a draft angle of about three degrees can be used in grey casting, and a draft angle of about five degrees can be used in forging.

In the optimal draft method, the user also inputs the corner radius 305. The corner radius, $r_0$, defines the smoothness of the transitions between the faces of the same side when the system changes the driving side. Using the corner radius, the system can ensure that two idly adjacent faces on a side will not have a sharp edge along their common edge when the driving side is changed. The corner radius is introduced in this situation to smooth the transition between these two adjacent faces.

Based on the functional dimensions, the parting surface, the neutral curves, the reflect surfaces, the corner radius (if any), and the minimum draft angles, the system computes the drafted solid 307. When the draft angle is added to both sides of the part, a blending equation is added to blend (or smooth) each upper and lower draft surface. It should be noted that this smoothing step is done between faces belonging to each side of the parting surface only if there are changes between which side drives the drafting process. The numerical solution can be computed through standard marching methods, numerical continuation, or other numerical methods that use abstract non-linear systems that feature n equations and n+1 unknowns. The equations are described below.

In the case of the driving-driven method, the user selects either the upper or lower draft angles 306, which becomes the nominal value for the angle that the system will add to the drafted faces. Because all faces from the selected side will be driving the calculation, there is no creation of filling faces and no need for a blending corner radius.

Figure 4:
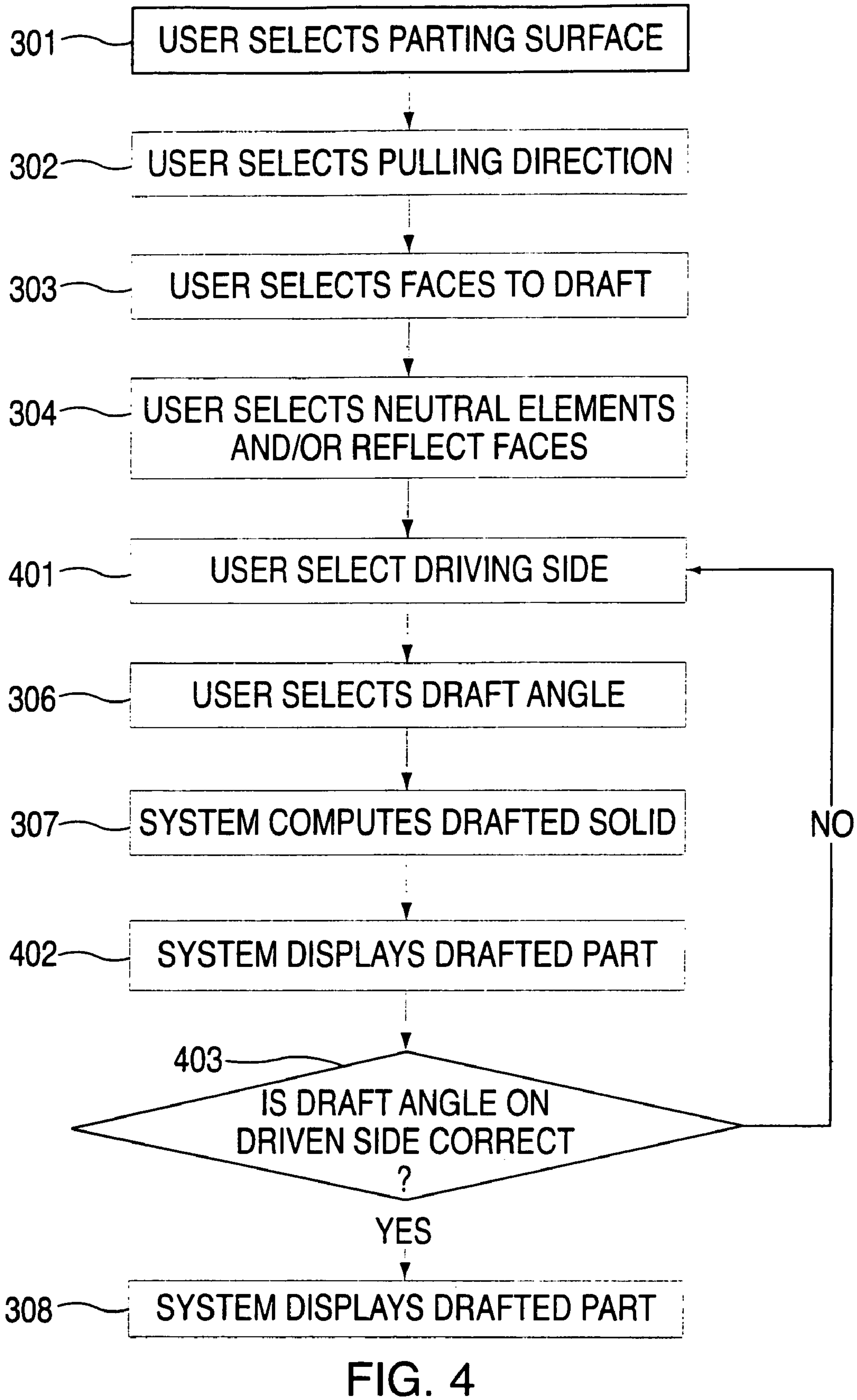
FIG. 4 illustrates a flowchart for computing a draft angle in the case of the driving-driven draft method.
Figure 5:
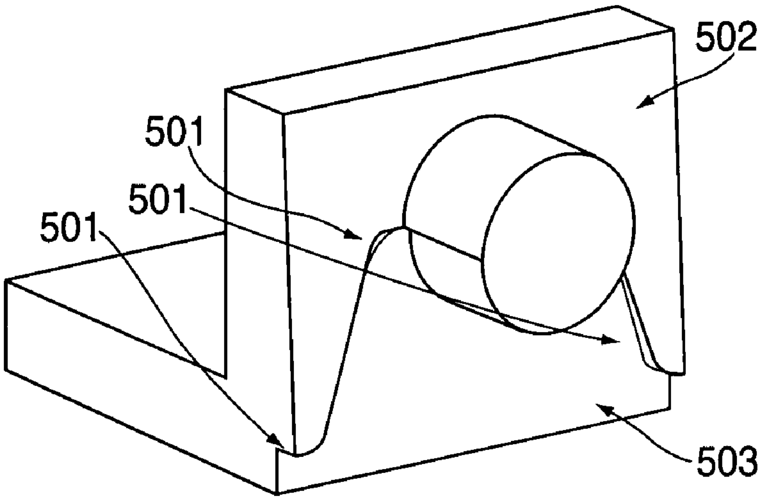
FIG. 5 illustrates two sides of a designed part that do not properly meet across the parting surface.
Figure 6:
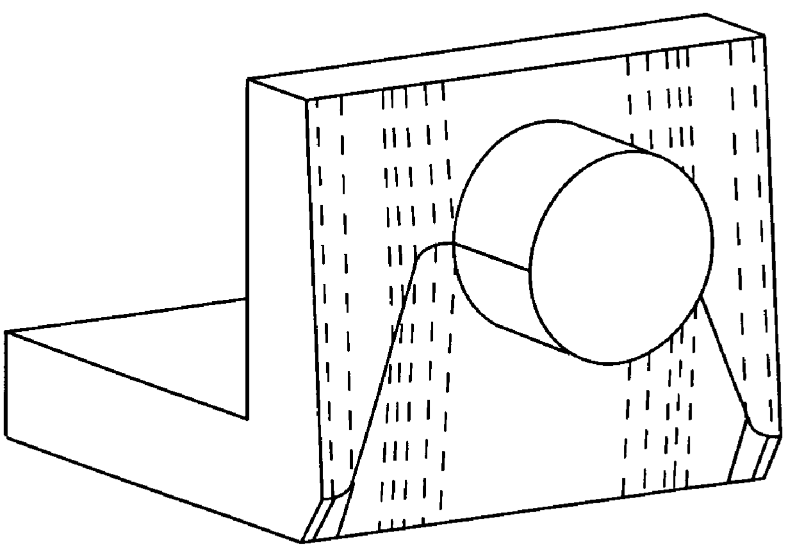
FIG. 6 illustrates the designed part of FIG. 5 after applying this invention.

FIG. 4 presents the flowchart for the driving-driven method. The user selects a driving side 401, which drives the driven side throughout the process. The user does not need to select a corner radius because there are no transistions. The user also selects a nominal value 306 for the draft angle on the driving side, but does not provide a value for the driven side's draft angle. The system computes the drafted solid 307 and displays the drafted part 402.

An example of a displayed part is shown in FIG. 13*a*. In this figure, the upper side was selected as the driving side and the drafted faces on the driven side were calculated by the system. After displaying the newly drafted faces, the user is asked whether the draft angle on the driven side is sufficient 403. If it is not, as in FIG. 13*a*, the user can reselect the driving side or select a new draft angle. The system then recomputes the drafted solid using the new slections. If the user finds the result acceptable, the system then displays the drafted part 308.

FIG. 13*b* shows an example of the result obtained after selection of an increased draft angle. Viewing FIGS. 13*a* and 13*b* in relation to FIG. 12, it is clear that the driving-driven method can result in a less optimal solution and can tend to require additional material to obtain the desired draft angles.

If the user is dissatisfied with the driving-driven method, the user may opt for the optimal blend draft method instead.

Figure 12:
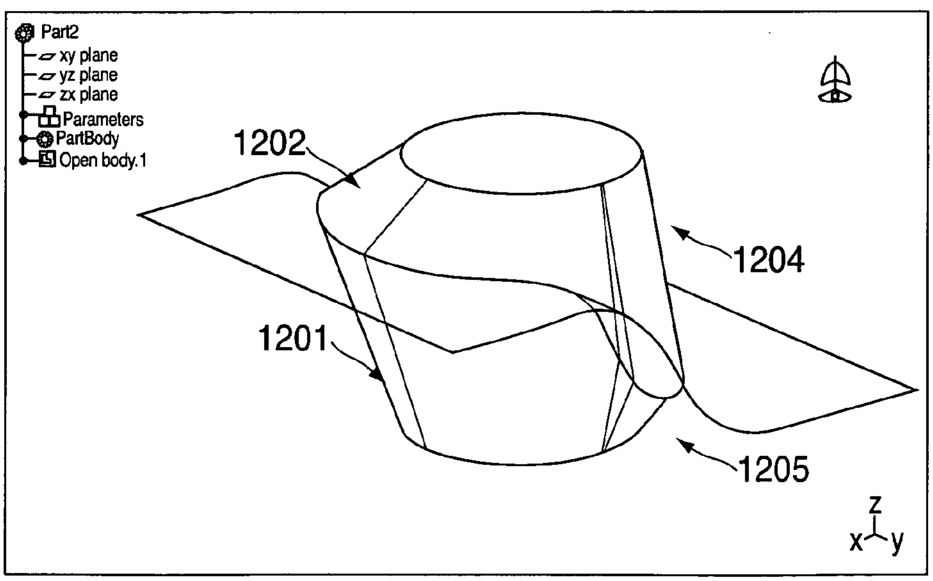
FIG. 12 illustrates the optimal blend draft method.

Computation Steps:

In the optimal blend draft method, the system drafts the two sides together in such a way that the minimum angle requiremnt is satisfied along the draft surfaces, and both sides fit on the parting surface. This feature is optimal because the minimum amount of material can be added to the part. This method shows possible transitions between the upper and lower sides using a blending equation. For example, for the first pair of upper and lower faces, the system may choose the upper face and use the $a_0$ value. For the next pair, the system may choose the lower face and use $b_0$ value, as is shown in FIG. 12. These transitions are based on a criterion of minimizing the amount of added matter. This will lead for the system to generate a filling surface 1203 using the corner radius, $r_0$. The whole process is covered by the blending equation.

The blending equation, $B(r_0,a_0,b_0,a,b,u,v, \ldots)=0$, is usually at least continuously differentiable and often twice continuously differentiable The blending equation can depend on the derivatives of the parting surface, neutral curves, and the reflect surfaces. The blending equation can capture the fact that the draft angles, a and b, are both greater than the minimum values, $a_0$ and $b_0$. If one of the draft angles is much greater than its minimum value (i.e., $a>>a_0$ or $b>>b_0$), the other angle provided by the equation should be close to (but still larger than) its minimum value ($b \approx b_0$ or $a \approx a_0$).

A generic shape of the blending equation is given in the following equation:

$$B(r_0,a_0,b_0,a,b,u,v, \ldots)=\sqrt{r_0^2+\|S(u,v)-P(.)\|^2}\sqrt{r_0^2+\|S(u,v)-Q(.)\|^2}(a-a_0)(b-b_0)-r_0^2 \quad \text{Equation 1,}$$

where $a \geqq a_0$ and $b \geqq b_0$.

Figure 11:
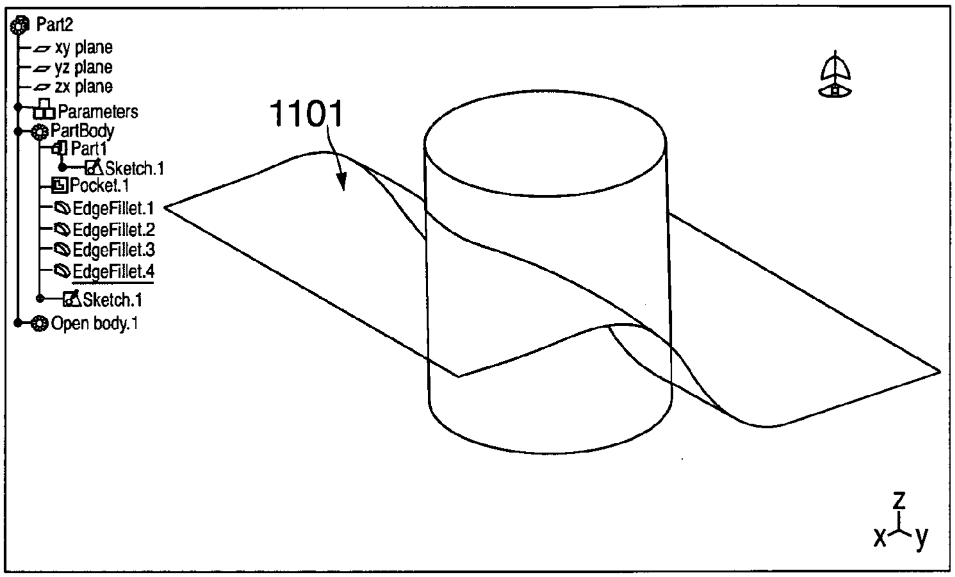

FIG. 11 presents an example of the use of the driving/drive method. The parting surface 1101 of the part creates a top and a bottom side. FIG. 12 shows the same part after the driving draft equation has been used to create a draft angle. On the left side, the bottom side 1201 drives the top side 1202. On the right side, the top side 1204 drives the bottom side 1205. The transition between the top side and the bottom side in both situations is a smooth transition 1203.

The neutral curve and the reflect surface cannot be defined at the same time on the same side. For this reason, the possible cases of surfaces include: (i) neutral curves on upper and lower sides; (ii) reflect surfaces on upper and lower sides; (iii) neutral curve on the upper side and reflect surface on the lower side; and (iv) reflect surface on the upper side and neutral curve on the lower side.

If a neutral curve is involved, the shape of the upper drafted surface is governed by the equations:

$$g(a,P(s)-S(u,v))=0$$

$$\langle g'(a,P(s)-S(u,v)) | P'(s)\rangle=0 \quad \text{Equation 2,}$$

where a is the current value of the upper draft angle, b is the current value of the lower draft angle, g(a,X)=0 and h(a,X) =0 are the implicit equations of the upper and the lower cones respectively, and g'(a,X) and h'(a,X) are the derivative of the cones functions with respect to the space variable. The upper cone's axis is the upper pulling direction, a is the cone's half angle, and X is the space variable.

Similar equations govern the lower drafted surface when a neutral curve is involved:

$$h(b,Q(t)-S(u,v))=0$$

$$\langle h'(b,Q(t)-S(u,v)) | Q'(t)\rangle=0 \quad \text{Equation 3.}$$

If a reflect surface is involved, the shape of the upper drafted surface is governed by the equations:

$$g(a, P(s_1, s_2) - S(u, v)) = 0 \quad \text{Equation 4}$$

$$\left\langle g'(a, P(s_1, s_2) - S(u, v)) \,\middle|\, \frac{\partial P}{\partial s_1}(s_1, s_2)\right\rangle = 0$$

$$\left\langle g'(a, P(s_1, s_2) - S(u, v)) \,\middle|\, \frac{\partial P}{\partial s_2}(s_1, s_2)\right\rangle = 0.$$

Similar equations govern the lower drafted surface when a reflect surface is involved:

$$h(b, Q(t_1, t_2) - S(u, v)) = 0 \quad \text{Equation 5}$$

$$\left\langle h'(b, Q(t_1, t_2) - S(u, v)) \,\middle|\, \frac{\partial Q}{\partial t_1}(t_1, t_2)\right\rangle = 0$$

$$\left\langle h'(b, Q(t_1, t_2) - S(u, v)) \,\middle|\, \frac{\partial Q}{\partial t_2}(t_1, t_2)\right\rangle = 0.$$

The blending equation, $B(r_0,a_0,b_0,a,b,u,v, \ldots)=0$, is then added to finish setting up the full system. It involves both the upper and lower draft angle values, the corner radius, the parameters of the parting surface, and the parameters of the neutral curve and/or the reflect surface.

The system sets up equations to solve based on the selected sides and types. In the first situation, when neutral curves are involved on both sides, the equations are:

$$g(a,P(s)-S(u,v))=0$$

$$\langle g'(a,P(s)-S(u,v)) | P'(s)\rangle=0$$

$$h(b,Q(t)-S(u,v))=0$$

$$\langle h'(b,Q(t)-S(u,v)) | Q'(t)\rangle=0$$

$$B(r_0,a_0,b_0,a,b,u,v,t)=0 \quad \text{Equation 6.}$$

This system can feature five scalar equations and six scalar unknowns: (u,v,s,t,a,b). Under usual regularity conditions, the solution is a parameterized arc in a six dimensional space:

$$\sigma \mapsto (u(\sigma),v(\sigma),s(\sigma),t(\sigma),a(\sigma),b(\sigma)) \quad \text{Equation 7,}$$

from which the drafted surfaces are easily computed. The upper drafted surface is the ruled surface parameterized by:

$$U(\sigma,\lambda)=P(s(\sigma))+\lambda(S(u(\sigma),v(\sigma))-P(s(\sigma))) \quad \text{Equation 8,}$$

and the lower drafted surface is the ruled surface parameterized by $$L(\sigma,\mu)=Q(t(\sigma))+\mu(S(u(\sigma),v(\sigma))-Q(t(\sigma))) \quad \text{Equation 9.}$$

When neutral curves are involved on both sides, the blending function in is $$B(r_0,a_0,b_0,a,b,u,v,s,t)=\sqrt{r_0^2+\|S(u,v)-P(s)\|^2}\sqrt{r_0^2+\|S(u,v)-Q(t)\|^2}(a-a_0)(b-b_0)-r_0^2 \quad \text{Equation 10}$$

In another situation, when reflect surfaces are involved on both sides, the equations are:

$$g(a, P(s_1, s_2) - S(u, v)) = 0 \quad \text{Equation 11}$$
$$\left\langle g'(a, P(s_1, s_2) - S(u, v)) \,\middle|\, \frac{\partial P}{\partial s_1}(s_1, s_2) \right\rangle = 0$$
$$\left\langle g'(a, P(s_1, s_2) - S(u, v)) \,\middle|_{r0}\, \frac{\partial P}{\partial s_2}(s_1, s_2) \right\rangle = 0$$
$$h(b, Q(t_1, t_2) - S(u, v)) = 0$$
$$\left\langle h'(b, Q(t_1, t_2) - S(u, v)) \,\middle|\, \frac{\partial Q}{\partial t_1}(t_1, t_2) \right\rangle = 0$$
$$\left\langle h'(b, Q(t_1, t_2) - S(u, v)) \,\middle|\, \frac{\partial Q}{\partial t_2}(t_1, t_2) \right\rangle = 0$$
$$B(r_0, a_0, b_0, a, b, u, v, s_1, s_2, t_1, t_2) = 0.$$

This system features seven scalar equations and eight scalar unknowns: $(u,v,s_1,s_2,t_1, t_2,a,b)$. Under regularity conditions, the solution is a parameterized arc in an eight dimensional space:

$$\sigma \mapsto (u(\sigma),v(\sigma),s_1(\sigma),s_2(\sigma),t_1(\sigma),t_2(\sigma),a,(\sigma),b(\sigma)) \quad \text{Equation 12,}$$

from which the drafted surfaces are easily computed. The upper drafted surface is the ruled surface parameterized by:

$$U(\sigma,\lambda)=P(s_1(\sigma),s_2(\sigma))+\lambda(S(u(\sigma),v(\sigma))-P(s_1(\sigma),s_2(\sigma))) \quad \text{Equation 13,}$$

and the lower drafted surface is the ruled surface parameterized by $$L(\sigma,\mu)=Q(t_1(\sigma),t_2(\sigma))+\mu(S(u(\sigma),v(\sigma))-Q(t_1(\sigma),t_2(\sigma))) \quad \text{Equation 14.}$$

The blending equation for the situation where the reflect surfaces are involved on both sides is $$B(r_0,a_0,b_0,a,b,u,v,s_1,s_2,t_1,t_2)=\sqrt{r_0^2+\|S(u,v)-P(s_1,s_2)\|^2}\sqrt{r_0^2+\|S(u,v)-Q(t_1,t_2)\|^2}(a-a_0)(b-b_0)-r_0^2 \quad \text{Equation 15.}$$

When a neutral curve is involved on the upper side and a reflect surface is involved on the lower side, the equations are:

$$g(a, P(s) - S(u, v)) = 0 \quad \text{Equation 16}$$
$$\langle g'(a, P(s) - S(u, v)) \mid P'(s)\rangle = 0$$
$$g(b, Q(t_1, t_2) - S(u, v)) = 0$$
$$\left\langle h'(b, Q(t_1, t_2) - S(u, v)) \,\middle|\, \frac{\partial Q}{\partial t_1}(t_1, t_2) \right\rangle = 0$$
$$\left\langle h'(b, Q(t_1, t_2) - S(u, v)) \,\middle|\, \frac{\partial Q}{\partial t_2}(t_1, t_2) \right\rangle = 0$$
$$B(r_0, a_0, b_0, a, b, u, v, s, t_1, t_2) = 0.$$

This system features six scalar equations and seven scalar unknowns: $(u,v,s,t_1,t_2,a,b)$. Under usual regularity conditions, the solution is a parameterized arc in an seven dimensional space:

$$\sigma \mapsto (u(\sigma),v(\sigma),s(\sigma),t_1(\sigma),t_2(\sigma),a(\sigma),a(\sigma),b(\sigma)) \quad \text{Equation 17,}$$

from which the drafted surfaces are easily computed. The upper drafted surface is the ruled surface parameterized by:

$$U(\sigma,\lambda)=P(s(\sigma))+\lambda(S(u(\sigma),v(\sigma))-P(s(\sigma))) \quad \text{Equation 18,}$$

and the lower drafted surface is the ruled surface parameterized by:

$$L(\sigma,\mu)=Q(t_1(\sigma),t_2(\sigma))+\mu(S(u(\sigma),v(\sigma))-Q(t_1(\sigma),t_2(\sigma))) \quad \text{Equation 19.}$$

The blending equation when a neutral curve is involved on the upper side and a reflect surface is involved on the lower side is:

$$B(r_0,a_0,b_0a,b,u,v,s,t_1,t_2)=\sqrt{r_0^2+\|S(u,v)-P(s)\|^2}\sqrt{r_0^2+\|S(u,v)-Q(t_1,t_2)\|^2}(a-a_0)(b-b_0)-r_0^2 \quad \text{Equation 20.}$$

Reflect-neutral equations are shown in the following set of equations.

$$g(a, P(s_1, s_2) - S(u, v)) = 0 \quad \text{Equation 21}$$
$$\left\langle g'(a, P(s_1, s_2) - S(u, v)) \,\middle|\, \frac{\partial P}{\partial s_1}(s_1, s_2) \right\rangle = 0$$
$$\left\langle g'(a, P(s_1, s_2) - S(u, v)) \,\middle|\, \frac{\partial P}{\partial s_2}(s_1, s_2) \right\rangle = 0$$
$$h(b, Q(t) - S(u, v)) = 0$$
$$\langle h'(b, Q(t) - S(u, v)) \mid Q'(t)\rangle = 0$$
$$B(r_0, a_0, b_0, a, b, u, v, s_1, s_2, t) = 0.$$

This system features six scalar equations and seven scalar unknowns: $(u,v,s_1,s_2 t,a,b)$. Under usual regularity conditions, the solution is a parameterized arc in a seven dimensional space:

$$\sigma \mapsto (u(\sigma),v(\sigma),s_1(\sigma),s_2(\sigma),t(\sigma),a(\sigma),b(\sigma)) \quad \text{Equation 22,}$$

from which the drafted surfaces are easily computed. The upper drafted surface is the ruled surface parameterized by:

$$U(\sigma,\lambda)=P(s_1(\sigma),s_2(\sigma))+\lambda(S(u(\sigma),v(\sigma))-P(s_1(\sigma),s_2(\sigma))) \quad \text{Equation 23}$$

and the lower drafted surface is the ruled surface parameterized by:

$$L(\sigma,\mu)=Q(t(\sigma))+\mu(S(u(\sigma),v(\sigma))-Q(t(\sigma))) \quad \text{Equation 24}$$

The blending equation when a reflect surface is involved on the upper side and a neutral curve is involved on the lower side is:

$$B(r_0,a_0,b_0,a,b,u,v,s_1,s_2,t)=\sqrt{r_0^2+\|S(u,v)-P(s_1,s_2)\|^2}\sqrt{r_0^2+\|S(u,v)-Q(t_1)\|^2}(a-a_0)(b-b_0)-r_0^2 \quad \text{Equation 25.}$$

Finally, after the equations are solved and, if necessary, the user accepts the computed part, the system can display the drafted part 308.

In the driving/driven draft method, there is no transition, and basically no need for a blending equation. To ease the mathematical formulation and implementation, however, the blending equation can still be used. In some implementations, only the driving/driven draft method can be made available to the user. In this case, the equation can be limited to a statement that the draft angle on the driving side has the nominal value selected by the user, namely:

$$B(r_0,a_0,b_0,a,b,u,v, \ldots)=a-a_0=0 \quad \text{Equation 26.}$$

If the upper side is driving, or lower side is driving, then the blending equations is:

$$B(r_0,a_0,b_0,a,b,u,v, \ldots)=b-b_0=0 \quad \text{Equation 27.}$$

All other equations as described in the previous section remain unchanged.

Although as already mentioned, the driving/driven method is not always as efficient as the optimal one, the simplified Equations 2 and 3 can lead to some savings in computation time and can be a useful trade-off between cost and efficiency in certain applications.

This invention can be applied as a feature provided in the CAD system. This feature can be edited for changes, inactivated, updated, or deleted like any other associative feature. In particular, if the user later changes the dimensions of the functional part, the system can replay the geometry with the new functional dimensions and effectively recalculate the draft angles for the part. The methods disclosed can also be used on complicated parts as is shown in FIG. 14.

The methods and systems disclosed can be implemented on a single computer, a networked computer or system, or any computing device designed to work with CAD or similar design systems. A number of embodiments of the present invention have been described. Nevertheless, it will be understood that various modifications may be made without departing from the spirit and scope of the invention.

What is claimed is:

1. A computerized method of industrializing a designed part, the method comprising:

selecting a parting surface that divides the designed part into a first side and a second side, wherein the designed part comprises a functional specification;

selecting a draft angle; and computing a change in the first side and the second side using the selected draft angle, wherein the functional specification is maintained and the first side and second side meet on the parting surface.

2. The method of claim 1 additionally comprising selecting a face of the designed part, wherein computing the industrialized designed part includes using the selected face.

3. The method of claim 2 additionally comprising:

selecting a pulling direction for the first side;

wherein the selected face is parallel to the pulling direction for the first side.

4. The method of claim 3 wherein computing an industrialized designed part additionally comprises using a plurality of faces adjacent to the selected face.

5. The method of claim 4 wherein the plurality of faces are bounded by a sharp edge.

6. The method of claim 1 additionally comprising displaying the computed industrialized designed part.

7. The method of claim 1 additionally comprising selecting between an optimal blend draft method and a driving/driven blend draft method.

8. The method of claim 7, wherein computation comprises using the optimal blend draft method.

9. The method of claim 7, wherein computation comprises using the driving/driven blend draft method.

10. The method of claim 8 additionally comprising selecting a corner radius for smoothing a connection between two adjacent faces, wherein computing the industrialized designed part includes using the corner radius.

11. The method of claim 10 wherein transitions between a face on each side comprises using a blending equation and the corner radius.

12. The method of claim 11 wherein the computation additionally comprises automatically switching a driving side to minimize material added, wherein the driving side is selected from the group consisting of the first side and the second side.

13. The method of claim 8 wherein the draft angle comprises a first minimum draft angle for the first side and a second minimum draft angle for the second side.

14. The method of claim 8, wherein the optimal blend draft method comprises a method wherein the minimum amount of surface area is added to the part during computation and supports a transition between a face on the first side and a face on the second side.

15. The method of claim 9 wherein the draft angle comprises a nominal draft angle.

16. The method of claim 15, wherein the nominal draft angle is not smaller than the selected draft angle.

17. The method of claim 9 additionally comprising selecting a driving side.

18. The method of claim 9 additionally comprising:

displaying the computed designed part; and recomputing the designed part based on new selections.

19. The method of claim 1 wherein the functional specification comprises a neutral element of the designed part, wherein the neutral element remains unchanged during the computation;

wherein the computation further comprises calculating the shape with the neutral element using a formula with the parting surface, the draft angle, an equation for a cone on the side of the neutral element, an equation for a derivative of the cone, the cone's half angle, and a space variable.

20. The method of claim 1 wherein the functional specification comprises a reflective element of the designed part, wherein the reflective element is tangent to the draft surface;

wherein the computation further comprises calculating the shape with the reflective element using a formula with the parting surface, the draft angle, an equation for a cone on the side of the reflective element, an equation for a derivative of the cone, and the reflect element.

21. The method of claim 1, wherein computation further comprises using a blending equation comprising:

$$B(r_0, a_0, b_0, a, b, u, v, \ldots) = \sqrt{r_0^2 + \|S(u,v) - P(.)\|^2}\,\sqrt{r_0^2 + \|S(u,v) - Q(.)\|^2}\,(a - a_0)(b - b_0) - r_0^2,$$

wherein S(u,v) represents a parting surface;

$r_0$ represents a corner radius;

P(.) represents a first curve or surface;

Q(.) represents a second curve or surface;

$a_0$ represents a minimum first draft angle;

$b_0$ represents a minimum second draft angle;

a represents a first draft angle; and b represents a second draft angle.

22. The method of claim 1, wherein computation further comprises using a blending equation comprising:

$$B(r_0, a_0, b_0, a, b, u, v, \ldots) = a - a_0,$$

wherein $a_0$ represents a minimum first draft angle and a represents a first draft angle.

23. The method of claim 1, wherein computation further comprises using a blending equation comprising:

$$B(r_0, a_0, b_0, a, b, u, v, \ldots) = b - b_0,$$

wherein $b_0$ represents a minimum second draft angle and b represents a second draft angle.

24. The method of claim 1, wherein computing the industrialized designed part comprises calculating a solution to an equation using a method selected from the list consisting of marching methods and numerical continuation.

25. The method of claim 1 wherein the parting surface is tangent continuous.

26. A computerized method of industrializing a designed part, the method comprising:

selecting a parting surface that divides the designed part into a first side and a second side, wherein the designed part comprises a functional specification;

selecting a pulling direction for the first side;

selecting a face of the designed part to add the draft angle;

selecting a corner radius for the designed part for a first side;

selecting a draft angle; and computing a change in the first side and the second side using the selected draft angle, selected pulling direction, and selected face, wherein a transition is implemented between the first side and second side using the selected corner radius, the functional specification is maintained, and the first side and second side meet on the parting surface.

27. A computerized method of industrializing a designed part, the method comprising:

selecting a parting surface that divides the designed part into a first side and a second side, wherein the designed part comprises a functional specification;

selecting a pulling direction for the first side;

selecting a face of the designed part to add the draft angle;

selecting a draft angle; and computing a change in the first side and the second side using the selected draft angle, selected pulling direction, and selected face, wherein a transition is implemented between the first side and the second side using a blending equation, the functional specification is maintained, and the first side and second side meet on the parting surface.

28. A computer system for industrializing a designed part, the system comprising:

a computer, wherein the computer comprises a memory and a processor; and executable software residing in the computer memory wherein the software is operative with the processor to:

select a parting surface that divides the designed part into a first side and a second side, wherein the designed part comprises a functional specification;

select a draft angle; and compute a change in the first side and the second side using the selected draft angle, wherein the functional specification is maintained, and the first side and second side meet on the parting surface.

29. The computer system of claim 28 wherein the software is operative with the processor to:

select a pulling direction for the first side;

select a face of the designed part to add the draft angle; and select a corner radius for the designed part for a first side;

wherein the computation additionally comprises using the selected pulling direction, and selected face, wherein a transition between the first side and the second side is implemented using the corner radius.

30. The computer system of claim 28 wherein the software is operative with the processor to:

select a pulling direction for the first side; and select a face of the designed part to add the draft angle;

wherein the computation additionally comprises using selected pulling direction, and the selected face, wherein a transition between the first side the second side is implemented using a blending equation.

31. A computer data signal embodied in a digital data stream for industrializing a designed part, the system comprising the steps of:

selecting a parting surface that divides the designed part into a first side and a second side, wherein the designed part comprises a functional specification;

selecting a draft angle; and computing a change in the first side and the second side using the selected draft angle, wherein the functional specification is maintained and the first side and second side meet on the parting surface.

32. The computer data signal of claim 31 additionally comprising:

selecting a pulling direction for the first side;

selecting a face of the designed part to add the draft angle;

selecting a corner radius for the designed part for a first side;

wherein the computation additionally comprises using the selected pulling direction, and selected face, wherein a transition between the first side and the second side is implemented using the selected corner radius.

33. The computer data signal of claim 31 additionally comprising:

selecting a pulling direction for the first side; and selecting a face of the designed part to add the draft angle;

wherein computing additionally comprises using selected pulling direction, and selected face, selected geometrical constraints, and a transition between a face on the first side and a face on the second side is implemented using a blending equation.

34. A computerized method of industrializing a designed part, the method comprising:

selecting a parting surface that divides the designed part into a first side and a second side, wherein the designed part comprises a functional specification;

selecting a draft angle; and computation means for adding the draft angle to the designed part while maintaining the functional constraints, the first side and second side meet on the parting surface, a minimum amount of material is added to the designed part, and no sharp edges are generated on the designed part.

35. A data storage apparatus storing instructions to configure a computer to:

select a parting surface that divides the designed part into a first side and a second side, wherein the designed part comprises a functional specification;

select a draft angle; and compute a change in the first side and the second side using the selected draft angle, wherein the functional specification is maintained, and the first side and second side meet on the parting surface.

36. The apparatus of claim 35 wherein the apparatus additionally stores instructions to configure a computer to:

select a pulling direction for the first side;

select a face of the designed part to add the draft angle; and select a corner radius for the designed part for a first side;

wherein the computation additionally comprises using the selected pulling direction, and selected face, wherein a transition between the first side and the second side is implemented using the corner radius.

37. The apparatus of claim 35 wherein the apparatus additionally stores instructions to configure a computer to:select a pulling direction for the first side; and select a face of the designed part to add the draft angle;

wherein the computation additionally comprises using selected pulling direction, and the selected face, wherein a transition between the first side the second side is implemented using a blending equation.

* * * * *